United States Patent
Shaffer et al.

(10) Patent No.: US 8,345,854 B2
(45) Date of Patent: Jan. 1, 2013

(54) METHOD AND SYSTEM USING PRESENCE INFORMATION TO IMPROVE SERVICES PROVIDED BY AUTOMATIC CALL DISTRIBUTION CENTERS

(75) Inventors: Shmuel Shaffer, Palo Alto, CA (US); Gebran G. Chahrouri, Menlo Park, CA (US); Labhesh Patel, Mountain View, CA (US); Joseph F. Khouri, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1944 days.

(21) Appl. No.: 11/058,874

(22) Filed: Feb. 16, 2005

(65) Prior Publication Data

US 2006/0182259 A1    Aug. 17, 2006

(51) Int. Cl.
    *H04M 3/00* (2006.01)
(52) U.S. Cl. .............................. 379/265.04; 379/210.01
(58) Field of Classification Search ............... 379/201.1, 379/265.01–266.1, 265.04, 210.01; 370/352; 709/224
See application file for complete search history.

(56) References Cited

U.S. PATENT DOCUMENTS

| | | | |
|---|---|---|---|
| 5,815,566 A * | 9/1998 | Ramot et al. | 379/210.01 |
| 6,038,544 A | 3/2000 | Machin et al. | 705/11 |
| 6,295,354 B1 * | 9/2001 | Dezonno | 379/266.01 |
| 6,385,646 B1 * | 5/2002 | Brown et al. | 709/217 |
| 6,577,727 B1 | 6/2003 | Hymel | 379/265.05 |
| 6,636,599 B1 * | 10/2003 | Mullen | 379/265.05 |
| 6,639,982 B1 | 10/2003 | Stuart et al. | 379/266.03 |
| 6,654,798 B1 * | 11/2003 | Skibinski et al. | 709/220 |
| 6,701,342 B1 * | 3/2004 | Bartz et al. | 709/200 |
| 6,771,764 B1 | 8/2004 | Dezonno | 379/265.02 |
| 6,782,093 B2 * | 8/2004 | Uckun | 379/266.06 |
| 6,804,345 B1 * | 10/2004 | Bala et al. | 379/265.04 |
| 6,940,849 B2 * | 9/2005 | Eichen et al. | 370/352 |

OTHER PUBLICATIONS

M. Day, et al., "*A Model for Presence and Instant Messaging*", Network Working Group, Request for Comments: 2778, Category: Informational, 17 pages, Feb. 2000.

* cited by examiner

*Primary Examiner* — MD S Elahee
(74) *Attorney, Agent, or Firm* — Baker Botts L.L.P.

(57) ABSTRACT

In accordance with a particular embodiment of the present invention, a method using presence information to improve automatic call distribution includes receiving a call for connection with one of a plurality of agents. An indicator of a service level problem is detected, and presence information is used to identify one or more draftable agents that are not in a ready state in response to detecting the indicator. The call is distributed to a selected one of the identified one or more draftable agents.

26 Claims, 2 Drawing Sheets

METHOD AND SYSTEM USING PRESENCE INFORMATION TO IMPROVE SERVICES PROVIDED BY AUTOMATIC CALL DISTRIBUTION CENTERS

TECHNICAL FIELD OF THE INVENTION

This invention relates in general to communication systems and, more particularly, to a method and system using presence information to improve services provided by automatic call distribution centers.

BACKGROUND OF THE INVENTION

Automatic call distributors (ACDs) and other contact centers typically include specialized systems designed to match incoming requests for service, for example a telephone call or an e-mail, with a resource that is able to provide that service, for example a human call center agent. ACDs generally perform one or more of the following functions: (i) recognize and answer incoming calls; (ii) review database(s) for instructions on what to do with a particular call; (iii) using these instructions, identify an appropriate agent and queue the call, often times providing a prerecorded message; and (iv) connect the call to an agent as soon as the agent is available.

In many instances, ACDs offer these services to third-party retailers or services providers who compensate the ACDs according to the terms of a Service Level Agreement (SLA) or other contract. Typically, an ACD is compensated based on the volume of calls answered by the ACD on behalf of the third-party. Furthermore, the SLA between generally stipulates that at an incoming call must be answered within a predetermined amount of time or another specified service level for the ACD to receive compensation for that call. For example, a SLA between a customer and an ACD may stipulate that the ACD must answer all incoming calls within twenty seconds. Any calls received and not answered within the given time frame may not be considered as "answered" for purposes of determining the fee owed to the ACD. Furthermore, if a call center fails to meet the agreed upon SLA, the customer may be entitled to compensation from the ACD service provider.

While it is desirable for an ACD to have enough agents on staff to fulfill their SLA and other service level commitments, overstaffing is undesirable. Accordingly, ACD service providers are continuously optimizing their systems to take into account these competing interests. As a result, many ACD agents are flexible employees that perform tasks other than answering incoming calls when the incoming call load is low. When the incoming call increases, bulletin boards are used to inform agents that they need to return to answering incoming calls. These bulletin boards are only effective as to those agents who are within reach of the bulletin boards. Furthermore, managers of ACD agents do not typically have adequate information for determining the availability of ACD agents to return to answering incoming calls.

SUMMARY OF THE INVENTION

The present invention provides a method and system for automatic call distribution that substantially eliminates or reduces at least some of the disadvantages and problems associated with previous methods and systems.

In accordance with a particular embodiment of the present invention, a method using presence information to improve automatic call distribution includes receiving a call for connection with one of a plurality of agents. An indicator of a service level problem is detected, and presence information is used to identify one or more draftable agents that are not in a ready state in response to detecting the indicator. The call is distributed to a selected one of the identified one or more draftable agents.

Technical advantages of particular embodiments of the present invention include the use of presence information to identify additional agents that may be drafted to receive incoming and queued calls. For example, agents that are currently on lower priority, non-ACD related calls may be identified and notified that their service is needed for ACD-related calls when an increase in call volume is detected or when an increase in a level of service is desired. Similarly, agents that are on a break or performing non-ACD related tasks may be drafted to receive incoming and queued calls. Accordingly, agent availability and productivity may be increased thus saving time and labor expense as agents communicating on non-business or personal calls or performing non-ACD related tasks may remain available to receive and handle customer or business-related calls.

Another technical advantage may include the use of presence information to prioritize the notification of draftable agents and identify the best notification mechanism available for alerting the agents that the agents' services are needed. Accordingly, draft notifications may be sent to those agents most likely to respond by making themselves available to receive incoming and queued calls. Furthermore, the response time of notified agents may be monitored, and response time information may be provided to managers and supervisors. As a result, managers and supervisors may recognize those agents contributing to the fulfillment of SLAs and other level of service commitments. Additionally, those agents that are not adequately responsive to draft notifications may be identified and appropriate measures taken.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
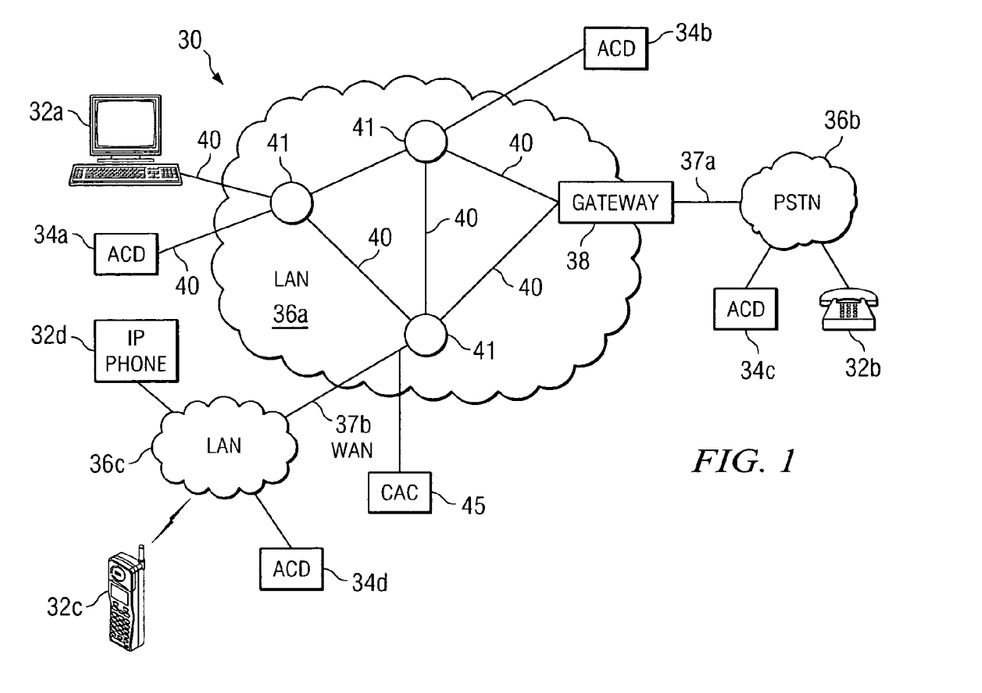
FIG. 1 illustrates a communication system including a plurality of endpoints operable to communicate among each other and a plurality of automatic call distributors, in accordance with a particular embodiment of the present invention.

FIG. 1 illustrates a communication system 30 including a plurality of endpoints 32a-32d having the ability to establish communication sessions between each other and/or automatic call distributors (ACDs) 34a-34d, using one or more of communication networks 36a-36c. ACDs are specialized communication systems designed to route incoming calls to available agents, so that calls are properly and/or evenly distributed. For the purposes of this specification, "automatic call distributor" or "ACD" shall refer to any combination of hardware, software and/or embedded logic which is operable to automatically distribute incoming calls. "Calls" shall include requests for service transmitted using any audio and/or video means, including signals, data or messages transmitted through voice devices, text chat, web sessions, facsimile, instant messaging and e-mail. ACDs may include outsourced call centers or other contact centers that receive incoming customer calls for distribution to agents and that place calls from agents to customers.

In the illustrated embodiment, incoming calls are routed to an ACD of a communication system. The calls are distributed to agents able to service the ACD. However, at times an agent may have left his desk, may be performing non-ACD related tasks, or may be otherwise unable to answer a distributed call. In such cases, the agent typically must log out of the ACD communication system or otherwise identify himself as being unready to receive incoming calls. The teachings of the present invention provide a system and method for automatic call distribution that utilizes presence detection to improve the services provided by the ACD. Specifically, the system and method may use presence detection and presence information to determine those agents who, although logged out of the ACD communication system or otherwise identified as unavailable, may be drafted to receive incoming calls. Those agents may then be personally and appropriately notified that an increase in call volume has occurred and requested to return to receiving incoming calls.

In the illustrated embodiment, communication network 36a is a local area network (LAN) that enables communication between a plurality of endpoints 32a-32d and ACDs 34a-34d distributed across multiple cities and geographic regions. In another embodiment, a single, central ACD may be used, which distributes incoming calls to agents distributed across multiple cities and geographic regions. Communication network 36b is a public switched telephone network (PSTN) and couples endpoint 32b and ACD 34c with communication network 36a through gateway 38. Communication network 36c is another LAN, which couples endpoints 32c and 32d and ACD 34d with communication network 36a. Accordingly, users of endpoints 32a-32d and automatic call distributors 34a-34d can establish communication sessions between and among each network component coupled for communication with one or more of networks 36a-36c. Communication links 37a and 37b couple communication networks 36a and 36b, and communication networks 36a and 36c, respectively. In the illustrated embodiment, communication link 37b is a wide area network (WAN), which couples LANs 36a and 36c. A call admission control (CAC) system 45 may be used to monitor and police the bandwidth available over WAN 37b.

Communication network 36a includes a plurality of segments 40 and nodes 41 that couple endpoint 32a with ACDs 34a and 34b, gateway 38, and communication networks 36b-36c. Therefore, a user of endpoint 32a is provided with access to endpoints 32b-32d, and automatic call distributors 34a-34d. Nodes 41 may include any combination of network components, gatekeepers, call managers, routers, hubs, switches, gateways, endpoints, or other hardware, software, or embedded logic implementing any number of communication protocols that allow for the exchange of packets in communication system 30.

Although the illustrated embodiment includes three communication networks 36a-36c, the term "communication network" should be interpreted as generally defining any network capable of transmitting audio and/or video telecommunication signals, data, and/or messages, including signals, data or messages transmitted through text chat, instant messaging and e-mail. Any one of networks 36a-36c may be implemented as a local area network (LAN), wide area network (WAN), global distributed network such as the Internet, Intranet, Extranet, or any other form of wireless or wireline communication network. Generally, network 36a provides for the communication of packets, cells, frames, or other portions of information (generally referred to as packets herein) between endpoints 32a-32d. Communication network 36a may include any number and combination of segments 40, nodes 41, endpoints 32a-32d, and/or ACDs 34a-34d.

In a particular embodiment, communication network 36a employs voice communication protocols that allow for the addressing or identification of endpoints, nodes, and/or ACDs coupled to communication network 36a. For example, using Internet protocol (IP), each of the components coupled together by communication network 36a in communication system 30 may be identified in information directed using IP addresses. In this manner, network 36a may support any form and/or combination of point-to-point, multicast, unicast, or other techniques for exchanging media packets among components in communication system 30. Any network components capable of exchanging audio, video, or other data using frames or packet, are included within the scope of the present invention.

Network 36a may be directly coupled to other IP networks including, but not limited to, another LAN or the Internet. Since IP networks share a common method of transmitting data, telecommunication signals may be transmitted between telephony devices located on different, but interconnected, IP networks. In addition to being coupled to other IP networks, communication network 36a may also be coupled to non-IP telecommunication networks through the use of interfaces or components, for example gateway 38. In the illustrated embodiment, communication network 36a is coupled with PSTN 36b through gateway 38. PSTN 36b includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 36b), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, endpoint 32d, ACDs 34a-34b, and gateway 38 are IP telephony devices capable of participating in IM, video, and other multimedia communication sessions. IP telephony devices have the ability of encapsulating a user's voice (or other input) into IP packets so that the voice can be transmitted over network 36a. IP telephony devices may include telephones, fax machines, computers running telephony software, nodes, gateways, wired or wireless devices, hand held PDA, or any other device capable of performing telephony functions over an IP network.

In particular embodiments, communication system 30 may receive and transmit data in a session initiation protocol (SIP) environment. SIP is an application-layer control protocol that includes primitives for establishing, modifying, and terminating communication sessions. SIP works independently of underlying transport protocols and without dependency on the type of session that is being established. SIP also transparently supports name mapping and redirection services, which support personal mobility.

It will be recognized by those of ordinary skill in the art that endpoints 32a-32d, ACDs 34a-34d, and/or gateway 38 may be any combination of hardware, software, and/or encoded logic that provides communication services to a user. For example, endpoints 32a-32d may include a telephone, a computer running telephony software, a video monitor, a camera, an IP phone, a cell phone or any other communication hardware, software, and/or encoded logic that supports the communication of packets of media (or frames) using communication network 36a. Endpoints 32a-32d may also include unattended or automated systems, gateways, other intermediate components, or other devices that can establish media sessions. Although FIG. 1 illustrates a particular number and configuration of endpoints, ACDs, segments, nodes, and gateways, communication system 30 contemplates any number or arrangement of such components for communicating media.

Figure 2:
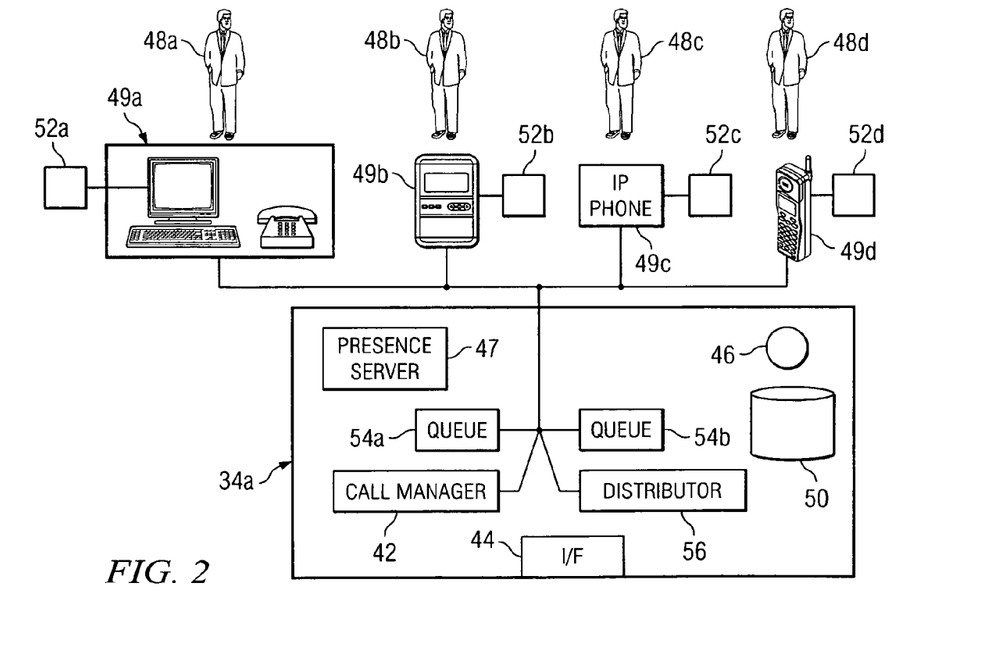
FIG. 2 illustrates an automatic call distributor of FIG. 1 in more detail, illustrating aspects of the present invention.

FIG. 2 illustrates ACD 34a in more detail, in accordance with a particular embodiment of the present invention. ACD 34a includes an interface or input ports 44 which couple ACD 34a with communication network 36a, using segment 40. A call manager 42 maintains information on all agents and other users of system 30 and facilitates communication among users. When ACD 34a experiences an increase in incoming calls, a processor 46 cooperates with call manager 42 and a presence server 47 to identify agents 48a-48d that can be contacted or otherwise recruited to handle a portion of the incoming calls at endpoints 49a-49d. As will be described in more detail below, the identification of the additional agents 48a-48d may be made by considering the whereabouts of the agents and/or their status with respect to ACD 34a and communication system 30.

In identifying and contacting available agents, processor 46 may use call manager 42, presence server 47, and/or a memory lookup, a database, or other memory module, such as memory module 50. Processor 46 may be a microprocessor, controller, or any other suitable computing device, resource, or combination of hardware, software, and/or encoded logic that allows processor 46 to identify agents 48a-48d that, although logged off of ACD 34a, may be available to receive incoming calls. Memory module 50 may be any form of volatile or non-volatile memory including, without limitation, magnetic media, optical media, random access memory (RAM), read-only memory (ROM), removable media, or any other suitable local or remote memory component.

Call manager 42 may be any combination of hardware, software, and/or encoded logic and is used by ACD 34a to manage agents 48 and other users of system 30. In particular embodiments, call manager 42 may maintain a listing, table, or other organization of information about agents 48 and other users of system 30. The information may include a name or other identifier for each agent 48 and other user. The information may also include contact information such as phone numbers and email addresses for the agents 48 and users. For identifying agents 48a-48d that may be contacted or otherwise recruited to handle incoming calls received by the ACD 34a, call manager 42 may also include information identifying whether a user of system 30 is a call agent or performs other tasks within the organization.

Presence server 47 may be any combination of hardware, software, and/or encoded logic, and is used to detect and monitor the presence of an agent 48 at an endpoint 49. Presence server 47 may include a single computer or a group of computers that are capable of detecting the presence of an agent 48 at an endpoint 49 in association with one or more of presence clients 52 at the agent's endpoint 48, for example, at the agent's personal computer (PC), phone, personal digital assistant (PDA,) or any other presence client device (e.g., presence clients 52a-52d). Examples of presence servers include presence servers as defined by IETF specifications.

ACD 34a uses processor 46 and presence server 47 to monitor conditions of ACD 34a, such as the number, type or characteristics of calls in queues 54 or the "state" of each agent 48. Agents 48 may be placed in various states, such as a "ready" state, a "not ready" state, or a "talking" state, according to their current status with respect to ACD 34a. For example, an agent 48 in a ready state may be ready and able to accept an incoming call distributed by ACD 34a. Conversely, an agent 48 in a not ready state may be away from his desk or otherwise unavailable for accepting an incoming call, and an agent 48 in a talking state may be communicating on a previously established ACD-related or customer-related call.

In particular embodiments, an agent 48 manually transfers himself from one state to another state. Accordingly, endpoints 49 may include a soft-key or other interface from which the end user can manually transition himself between any supported agent states. For example, an agent 48 may transfer himself from a ready state to a not ready state by pressing an appropriate key or button on the agent's endpoint 49. In other embodiments, presence server 47 may automatically transition an agent 48 between states based on a characteristic of an incoming call or incoming caller, a characteristic of the agent 48, or a characteristic of an established call or caller. For example, presence server 47 may automatically transition the agent 48 to a talking state when the agent 48 answers an incoming ACD-related call. As another example, presence server 47 may automatically transition an agent 48 from a ready state to a not ready state when the agent 48 begins using a non-ACD associated endpoint, such as the agent's personal cell phone.

In still other embodiments, the transitioning of an agent 48 between states may include a combination of manually implemented and automatically implemented transitions. Accordingly, and as described above, presence server 47 may automatically transition an agent 48 to a talking state when agent 48 answers an incoming ACD-related call. When the agent 48 performs other non-ACD related tasks, however, the agent may manually transition himself to a not ready state by pressing a soft-key on the agent's phone. As another example, if an agent 48 in a ready state receives an incoming ACD-related call but does not answer that call, the agent 48 may be automatically transitioned to a not-ready state.

When an incoming call is received by processor 46, processor 46 uses state information provided by presence server 47 to determine if a suitable agent 48 is available to receive an incoming call and, thus, is in a ready state. Where such an agent 48 is available, a distributor 56 of ACD 34a distributes the call to the available agent 48 for handling. Such handling may comprise, for example, connecting a caller of the call with the available agent 48 if the call comprises a voice call or forwarding the call to the available agent 48 if the call comprises, for example, an e-mail. If an available agent 48 is not available, however, the call may be placed into a queue 54 in order to wait for an available agent 48. In this embodiment, ACD 34a has two queues 54; however other embodiments of the present invention may have none, one, or more than two queues 54.

The selection of which queue 54 to place an incoming call may depend on the type of customer making the call, the type of service requested in the call, or any other characteristic or condition relating to the call or ACD 34a. While a customer is waiting for an agent 48, ACD 34a may perform one or more of several functions including data collection from the user, playing of pre-recorded messages, or other automated process. As soon as a suitable agent 48 becomes available, distributor 52 distributes the call to the appropriate agent 48.

When ACD 34a experiences a spike or other unexpected increase in incoming calls, the backlog of calls in queues 54 may dramatically increase. In such a scenario, the number of incoming calls may greatly exceed the number of agents 48 that are logged into communication system 30 and in a ready state. Accordingly, processor 46 or another component of ACD 34a may continuously monitor a level of service provided by ACD 34a. For example, ACD 34a may monitor the amount of time that a call remains in a queue 54 before it is distributed to an available agent 48. Additionally or alternatively, ACD 34a may monitor a percentage or number of agents 48 that are currently on incoming calls or available to take incoming calls in relation to the number of incoming calls or the number of calls in queues 54. Other suitable service related characteristics, such as the length of time it takes to handle an incoming call, may also be monitored to determine the level of service provided by ACD 34a.

In particular embodiments, monitoring the level of service provided by ACD 34a may result in the detection of an indicator of a service level problem. Probability theories, algorithms, or other logic may be used by ACD 34a to identify a service level problem from the information obtained while monitoring the level of service provided by ACD 34a. In particular embodiments, the indicator of the service level problem may identify to ACD 34a that SLA and/or other service level commitments are not being met by ACD 34a. In other embodiments, the indicator of the service level problem may identify to ACD 34a that SLA and/or other service level commitments may not be met in the near future. Thus, the indicator of the service level problem may be detected by ACD 34a before SLA or other service commitments are not met and, thus, may serve as a warning to ACD 34a.

Accordingly, at any time, ACD 34a may not only know the level of service that ACD 34a is delivering but may also be able to predict the ACD's ability to meet the SLA in the near future. When the indicator of the service level problem is detected by ACD 34a, ACD 34a may operate to identify and draft additional agents 48 to receive incoming and queued calls. In particular embodiments, ACD 34a may use information resulting from the continuous monitoring of the level of service provided by ACD 34a to identify the number of agents 48 needed to meet SLA requirements. ACD 34a may then identify and draft any appropriate number of additional agents 48 to receive incoming and queued calls.

In a first example scenario, a first agent 48a may be on a call that is of a lower priority than that of potential incoming calls. Such a scenario may be present where, for example, first agent 48a is on a personal, private, or otherwise non-business or non-customer-related call. Where first agent 48a receives or makes such a call, first agent 48a may be manually or automatically transitioned from a ready state to a not ready state. Alternatively, first agent 48a may be placed in an on-call ready state, which may specifically indicate to distributor 56 and other components of ACD 34a that first agent 48a is available for receiving incoming customer calls from ACD 34a even though first agent 48a is currently on another call.

In particular embodiments, ACD 34a may prioritize sending calls to agents 48 that are in a ready state (e.g., phone onhook and ready to receive customer calls) over first agent 48a when first agent 48a is in a not ready or on-call ready state. For example, ACD 34a may first send customer calls to all agents 48 in the ready state. When ACD 34a identifies that the level of service provided by ACD 34a has fallen below or may fall below SLA and/or other service level commitments, however, processor 46 may cooperate with presence server 47 to identify that first agent 48a, who may be in a not ready state or in an on-call ready state, may be drafted to help in handle queued and incoming calls.

To draft first agent 48a, processor 46 may generate and transmit a notification to an endpoint 49 associated with first agent 48a. The notification may include a pop up window on the first agent's computer, phone, or other endpoint, an instant message (IM), a short message service (SMS) message, a message ring, a whisper message, or any other suitable notification that operates to alert first agent 48a that an increase in incoming calls is being experienced by system 30 and that a desired level of service is not being met or may not be met in the near future. Presence information may be used by ACD 34a to determine the appropriate means of notifying first agent 48a. For example, since first agent 48a is on the phone, processor 46 may transmit an email or IM that is delivered to the first agent's workstation computer.

As another example, presence server 47 may initiate a "whisper message" to first agent 48a. The whisper message may include a voice message that is delivered on the first agent's telephone while that telephone is in use by first agent 48a on a lower priority call. Thus, in the example described above, first agent 48a may hear a message such as, "Please return to a ready state to receive an incoming call," as first agent is conducting the lower priority call. Although the whisper message may be voiced-over the lower priority call, in particular embodiments, only first agent 48a may hear the whisper message, and other participants in the lower priority call may remain unaware of the whisper message. The whisper message allows first agent 48a to finalize the lower priority call so that first agent 48a may answer an incoming call distributed to first agent 48a by ACD 34a.

Upon receiving the whisper message or other notification, first agent 48a may be transitioned to a ready state after completing the lower priority call. As described above, the transition may be manually or automatically implemented. Thus, first agent 48a may press a ready state button on the agent's desktop to transition to a ready state. Alternatively, presence server 47 may automatically transition first agent 48a to a ready state when first agent 48a hangs up the receiver after completing the lower priority call.

In a second example scenario, a second agent 48b may be required to logoff of ACD 34a when the agent 48 is no longer available to take incoming calls. Accordingly, second agent 48b may initiate and complete a logoff procedure when second agent 48b goes to lunch, takes a break, attends a meeting, is out of the office on work-related activities, leaves for vacation, leaves early because of illness, or performs any other activity which results in second agent 48b being unavailable to receive incoming calls. During the logoff procedure, second agent 48b may be required to specify a logoff reason, which identifies to ACD 34a a reason that the agent 48 is no longer available to receive incoming calls.

In particular embodiments, second agent 48b is able to revise the specified logoff reason without logging onto ACD 34a. To make such a change, second agent 48b may be authenticated or otherwise identified to system 30. Second agent 48b may then be prompted for a logoff reason if second agent 48b desires to remain logged off of ACD 34a. In this manner, if second agent 48b returns from lunch but desires to begin performing non-ACD related tasks rather than receive incoming calls, second agent 48b may change the logoff reason associated with second agent 48b from "at lunch" to "other tasks."

When ACD 34a receives a spike or increase in call volume, ACD 34a may use logoff reasons to identify agents 48 that may be drafted to receive queued and incoming calls. For example, if second agent 48a has logged off of ACD 34a to perform non-ACD related tasks, second agent 48a may be identified as an agent that may be drafted to receive a queued or incoming call. In particular embodiments, ACD 34a may also use the logoff reason to determine the order in which agents 48 should be drafted to take incoming calls. Thus, agents 48 that can be identified as likely to be at or near their work station may be drafted before agents 48 that are "on break." For similar reasons, agents 48 that are logged off because they are "on vacation" may not be drafted at all.

Once ACD 34a identifies that second agent 48b is a candidate for being drafted to receive incoming calls, ACD 34a may generate and transmit a notification to an endpoint 49b associated with second agent 48b. The notification may alert second agent 48b that an increase in incoming calls is being experienced by system 30 or that a desired level of service is not being met by ACD 34a or may not be met by ACD 34a in the near future.

In particular embodiments, the logoff reason provided by second agent 48b or other presence information available to processor 46 may be used to determine the best means for delivering the notification. For example, if the logoff reason identifies second agent 48b as "performing non-ACD related business tasks," the notification may be delivered as a pop up window on a computer, phone, or other endpoint at the second agent's work station. If the logoff reason identifies second agent 48b as being at lunch or performing another task away from the second agent's work station, however, an electronic page may be sent to a pager associated with second agent 48b. Additionally or alternatively, an IM or a message ring may be sent to a cell phone or PDA device associated with second agent 48b.

In another example scenario, ACD 34a may utilize presence server 47 and presence information stored for agents 48 to determine the location of a third agent 48c to determine if third agent 48c can be drafted to receive incoming calls. Thus, presence information associated with third agent 48c may be used to track third agent 48c for purposes of determining whether third agent 48c can take incoming calls during an increase in call volume. Assume, for example, that presence server 47 identifies that third agent 48c is using an IP phone 49c located at the third agent's workstation. Assume also that presence server 47 identifies that fourth agent 48d is using a mobile phone 49d. Processor 46 may use this information to determine that third agent 48c may be able to react more quickly to receive an incoming call than fourth agent 48d. Accordingly, processor 46 may notify third agent 48c that he is needed to receive a queued or incoming call. Third agent 48c may then login to system 30, transition to a ready state, or otherwise indicate his availability to ACD 34a. Distributor 56 may then route the queued or incoming call to third agent 48c.

As described above, presence information and other location information maintained by presence server 47 may be used to determine the best means for delivering a draft notification to third agent 48c. If the presence information identifies that third agent 48c is using IP phone 49c, for example, ACD 34a may generate and transmit a whisper message that is delivered to third agent 48c in a manner similar to that described above with regard to the first example scenario. Conversely, if the presence information identifies that a cell phone associated with third agent 48c is turned on, a phone call may be communicated to third agent 48c to notify third agent 48c that he should return to his work station and ready himself to receive incoming calls. As still another example, if the presence information identifies that third agent 48c is using a computer, PDA, or other electronic device capable of receiving text messages, a text message such as a pop-up, an email, an IM, or SMS message may be generated and communicated to an appropriate endpoint of third agent 48c.

In any of the above described examples, it is recognized that ACD 34a may track and keep records of an agent's response time to a draft notification. Accordingly, a record may be made of the time it takes each agent 48 to log into the system, transition to a ready state, or otherwise identify to ACD 34a that the agent 48 is available to receive incoming calls. If first agent 48a is on a lower priority call (as in the first example scenario), ACD 34a may track the amount of time it takes first agent 48a to end the lower priority call and take a new ACD-related call after the whisper message or other notification is received. Similarly, if second agent 48b is logged off of ACD 34a because second agent 48b is on a break (as in the second example scenario), ACD 34a may track the amount of time it takes second agent 48b to return to his workstation and login to the system after receiving the notification.

An agent's response time may be provided to managers and other supervisors. In particular embodiments, this response time may be provided to managers and supervisors on a real-time basis as the response information is received. For example, a manager overseeing first agent 48a may be notified of first agent's response time when first agent 48a logs on to ACD 34a and begins receiving incoming calls.

Additionally, the response time of first agent 48a may be compiled with historical data associated with first agent 48a and/or other agents 48. Historical reports may be provided to the managers and supervisors on a periodic basis. The response time information may be used to make decisions about the staffing of the call center, the ACD's ability to meet SLA requirements, the response time(s) of a particular agent or group of agents, the offering of promotions or other benefits, and other ACD related business decisions. The historical reports of such data may also be used for forecasting workforce planning.

It will be recognized by those of ordinary skill in the art that ACD 34a is merely one example configuration of an ACD for using presence detection to identify and contact agents 48 for incoming calls. ACD 34a may include any number of call managers, processors, memory modules, presence servers, distributors, and queues to accomplish the functionality and features described herein. For example, although ACD 34a is illustrated and described as including a call manager 42, a processor 46, a presence server 47, a memory module 50, two queues 54, and a distributor 56, these components and other desired components for performing the above described functionality may be centrally located (local) with respect to one another, or distributed throughout communication networks 36.

Additionally, it will be recognized that the configuration of endpoints 49a-49d illustrated in FIG. 2 is for example purposes only. Accordingly, while a computer and phone are illustrated as being associated with first agent 48a and a pager is illustrated as being associated with second agent 48b, it is recognized that any endpoint may be associated with any of the agents 48 illustrated in FIG. 2. Furthermore, it is recognized that some, none, or all of the endpoints associated with an agent 48 may be capable of communication with incoming callers to ACD 34a.

Figure 3:
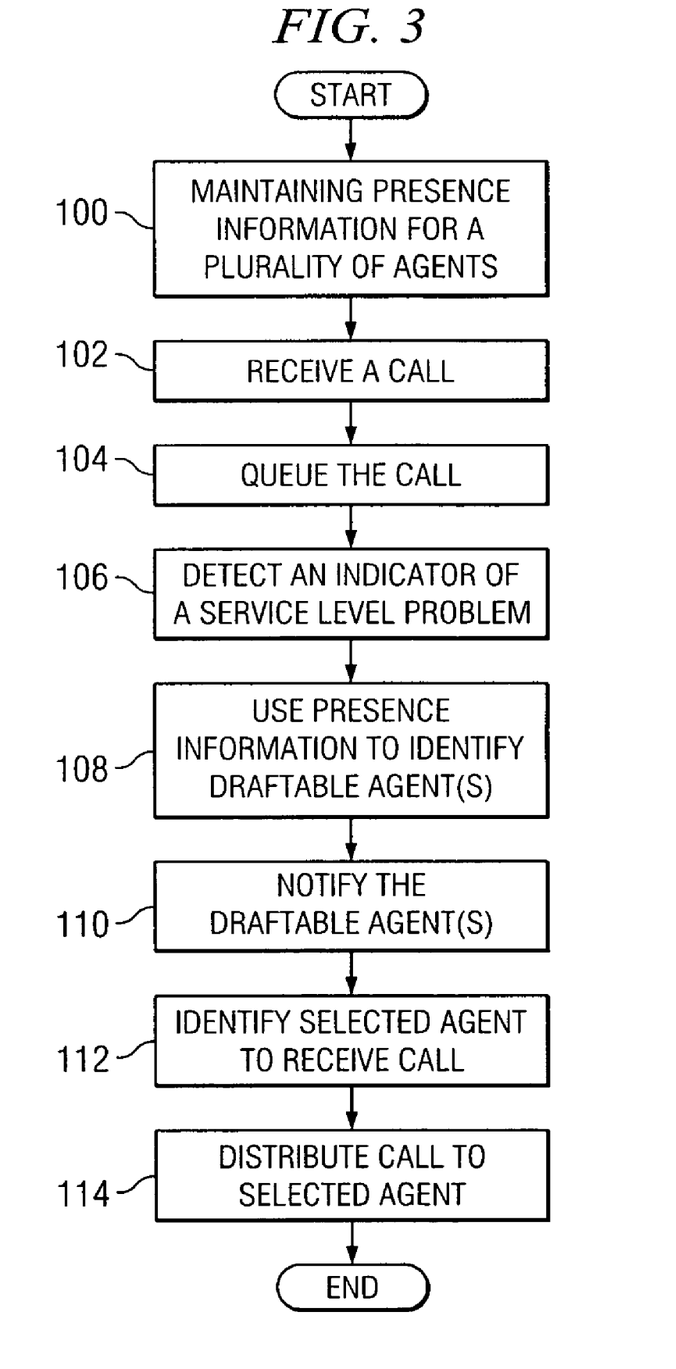
FIG. 3 illustrates a method that uses presence information to improve automatic call distribution, in accordance with an embodiment of the present invention.

FIG. 3 is a flowchart illustrating a method that uses presence information to improve automatic call distribution. The method begins at step 100 where presence information is maintained for a plurality of agents 48 associated with an ACD 34. In particular embodiments, the presence information associated with a particular agent 48 may identify the agent's availability with regard to one or more endpoints 49.

For example, the presence information may identify whether an agent 48 is logged into a computer, whether a cell phone associated with the agent 48 is turned on, whether the agent 48 is on a non-ACD call, or whether an email program used by the agent 48 is operating. Because the presence information identifies the status of the endpoints 49 associated with the agent 48, the presence information may be used to identify the location of the agent 48 and his status with regard to ACD 34a.

At step 102, a call is received. In various embodiments, the call is received at ACD 34a or another contact center for distribution to and connection with one or more of the plurality of agents 48 providing services to ACD 34a. The call is placed in a queue 54 at step 104. As described above, queue 54 may be used to store an incoming call while an appropriate agent 48 is identified to receive the incoming call. Where there is a backlog of calls in queue 54 or where there are no additional agents 48 in a ready state to receive the incoming call, the incoming call may remain in a queue 54 until an appropriate agent 48 becomes available and is identified.

At step 106, an indicator of a service level problem is detected. The detection of the service level problem may result from the continuous monitoring of the level of service provided by ACD 34a at any given time. In particular embodiments, the detection of the service level problem may signal to ACD 34a that the level of service provided by ACD 34a has fallen below SLA or other service level commitments. In other embodiments, the detection of the service level problem may signal to ACD 34a that the level of service provided by ACD 34a may fall below SLA or other service level commitments at some time in the future. As described above with regard to FIG. 2, characteristics of ACD 34a that may be monitored to result in the detection of the indicator of a service level problem in step 106 may include the amount of time that calls remain in queue 54 before being distributed to available agents 48, a percentage or number of agents 48 that are currently on incoming calls or available to take incoming calls in relation to the number of incoming calls or the number of calls in queues 54, and the length of time it takes to handle an incoming call.

After the detection of an indicator of a service level problem, the method continues to step 108 where presence information provided by presence server 47 is used to identify one or more draftable agents 48. A draftable agent 48 may include an agent that, while currently recognized as unavailable by system 30, may be recruited to receive the incoming call or another call in queue 54. In particular embodiments, draftable agent 48 may include an agent that is logged into communication system 30 but is not recognized as being in a ready state by presence server 47. Alternatively, draftable agent 48 may include an agent that is logged off of ACD 34a. In such an embodiment, a logoff reason may be used to determine whether a particular agent 48 is accessible to ACD 34a and, thus, may be truly considered draftable.

At step 110, the one or more draftable agents 48 identified at step 108 are notified that their services are requested or required. As described above, the presence information associated with the draftable agents 48 may be used to identify the best mechanisms for notifying the draftable agents 48 that their services are needed. An appropriate email, IM, SMS, text, or phone message may then be delivered to endpoints associated with the draftable agents 48. Upon receiving such a notification, a draftable agent 48 may then return to the agent's workstation, login to system 30, and transition into a ready state.

A selected agent may be identified to receive the call at step 112, and the incoming call distributed to the selected agent at step 114. While the selected agent may include one of the draftable agents 48 identified at step 108, it is also understood that the selected agent may include other agents in a ready state. Calls stored in a queue 54 are typically distributed on a first in, first out basis. Accordingly, an agent 48 identified as draftable in step 108 may not receive the call received at step 102 but may receive another call that has been in queue 54 for a longer period of time than the incoming call received at step 102.

Some of the steps illustrated in FIG. 3 may be combined, modified or deleted where appropriate, and additional steps may also be added to the flowchart. Additionally, steps may be performed in any suitable order without departing from the scope of the invention.

As indicated above, technical advantages of particular embodiments of the present invention include the use of presence information to identify additional agents that may be drafted to receive incoming and queued calls. For example, agents that are currently on lower priority, non-ACD related calls may be identified and notified that their service is needed for ACD-related calls when an increase in call volume is detected or when an increase in service is desired. Similarly, agents that are on a break or performing non-ACD related tasks may be drafted to receive incoming and queued calls. Accordingly, agent availability and productivity may be increased thus saving time and labor expense as agents communicating on non-business or personal calls or performing non-ACD related tasks may remain available to receive and handle customer or business-related calls.

Other technical advantages may include the use of presence information to prioritize the notification of the agents and identify the best notification mechanisms available for alerting draftable agents that the agents' services are needed. Accordingly, draft notifications may be sent to those agents most likely to respond by making themselves available to receive incoming and queued calls. Furthermore, the response time of notified agents may be monitored, and response time information may be provided to managers and supervisors. As a result, managers and supervisors may recognize those agents contributing to the fulfillment of SLAs and other level of service commitments. Additionally, those agents that are not adequately responsive to draft notifications may be identified and appropriate measures taken.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 30 and automatic call distributor 34a, these elements may be combined, rearranged or positioned in order to accommodate particular routing architectures or needs. In addition, any of these elements may be provided as separate external components to communication system 30, automatic call distributor 34a or each other where appropriate. The present invention contemplates great flexibility in the arrangement of these elements as well as their internal components.

As another example, the present invention has been described with reference to outsourced ACD call centers. It is recognized, however, that the architecture and functionality described above is applicable generally to all call or contact centers that operate to answer incoming calls and identify appropriate agents to receive the calls. Accordingly, the described ACDs may include those call or contact centers that are located within an enterprise and are staffed by enterprise employees. ACDs are not intended to be limited to hosted and outsourced call or contact centers.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for using presence information to improve automatic call distribution, comprising:
   receiving a call for connection with one of a plurality of agents;
   receiving presence information from the plurality of agents, the plurality of agents comprising at least one agent that is logged off of an automatic call distributor, the presence information indicating whether the plurality of agents are draftable to receive the call;
   storing the received presence information in a presence server;
   detecting an indicator of a service level problem;
   in response to detecting the indicator, using the presence information to identify one or more draftable agents that are not in a ready state, including using the presence information to identify at least one draftable agent of the plurality of agents that is logged off of an automatic call distributor; and
   distributing the call to a selected one of the identified one or more draftable agents.

2. The method of claim 1, wherein at least one of the one or more draftable agents are logged into an automatic call distributor but are in a not ready state.

3. The method of claim 1, wherein using the presence information comprises using log-off reason codes associated with at least one of the one or more draftable agents to identify the one or more draftable agents.

4. The method of claim 1, wherein at least one of the one or more draftable agents are participating a non-automatic call distributor call.

5. The method of claim 1, wherein detecting the indicator of the service level problem comprises determining that service level commitments are not being met.

6. The method of claim 1, wherein detecting the indicator of the service level problem comprises determining the amount of time that one or more previous calls remain in a queue before the one or more previous calls are distributed to one or more selected agents in a ready state.

7. The method of claim 1, wherein detecting the indicator of the service level problem comprises determining a number of agents that are logged into an automatic call distributor in relation to a number of previous calls stored in a queue.

8. The method of claim 1, wherein distributing the call to the selected one of the identified one or more draftable agents comprises:
   notifying the selected draftable agent that the selected draftable agent is needed to receive the call;
   receiving login information from the selected draftable agent; and
   transferring the selected draftable agent to the ready state.

9. The method of claim 1, further comprising maintaining presence information for a plurality of agents that are logged into an automatic call distributor but are in a not ready state.

10. The method of claim 9, wherein notifying the one or more draftable agents comprises playing a whisper message for the one or more draftable agents while the one or more draftable agents are on a call.

11. The method of claim 1, further comprising maintaining presence information for a plurality of agents that are logged off of an automatic call distributor.

12. The method of claim 1, further comprising:
   monitoring the response time of the selected one of the identified draftable agents; and
   providing response time information comprising the response time to a manager of the selected one of the identified draftable agents.

13. An automatic call distribution system, comprising:
   a presence server operable to:
      receive presence information from a plurality of agents, the plurality of agents comprising at least one agent that is logged off of an automatic call distributor, the presence information indicating whether the plurality of agents are draftable to receive a call; and
      store the presence information for the plurality of agents;
   a processor in communication with the presence server and operable to:
      receive the call for connection with one of the plurality of agents;
      detect an indicator of a service level problem; and
      in response to detecting the indicator, use the presence information to identify one or more draftable agents that are not in a ready state, including using the presence information to identify at least one draftable agent of the plurality of agents that is logged off of the automatic call distributor; and
   a distributor in communication with the processor and operable to distribute the call to a selected one of the identified one or more draftable agents.

14. The system of claim 13, wherein at least one of the one or more draftable agents are logged into an automatic call distributor but are in a not ready state.

15. The system of claim 13, wherein the processor is further operable to use log-off reason codes associated with at least one of the one or more draftable agents when using the presence information to identify the one or more draftable agents.

16. The system of claim 13, wherein at least one of the one or more draftable agents are participating in a non-automatic call distributor call.

17. The system of claim 13, wherein the processor is further operable to detect the indicator of the service level problem by determining that service level commitments are not being met.

18. The system of claim 13, wherein the processor is further operable to detect the indicator of the service level problem by determining the amount of time that one or more previous calls remain in a queue before the one or more previous calls are distributed to one or more selected agents in a ready state.

19. The system of claim 13, wherein the processor is further operable to detect the indicator of the service level problem by determining a number of agents that are logged into an automatic call distributor in relation to a number of previous calls stored in a queue.

20. The system of claim 13, wherein the processor is further operable to:
   notify the selected draftable agent that the selected draftable agent is needed to receive the call; and
   receive login information from the selected draftable agent; and
   transfer the selected draftable agent to the ready state.

21. The system of claim 13, wherein the processor is further operable to maintain presence information for a plurality of agents that are logged into an automatic call distributor but are in a not ready state.

22. The system of claim 21, wherein the processor is further operable to notify the one or more draftable agents by playing a whisper message for the one or more draftable agents while the one or more draftable agents are on a call.

23. The system of claim 13, wherein the processor is further operable to maintain presence information for a plurality of agents that are logged off of an automatic call distributor.

24. The system of claim 13, wherein the processor is further operable to:
monitor the response time of the selected one of the identified draftable agents; and
provide response time information comprising the response time to a manager of the selected one of the identified draftable agents.

25. An automatic call distribution system, comprising:
means for receiving a call for connection with one of a plurality of agents;
means for receiving presence information from the plurality of agents, the plurality of agents comprising at least one agent that is logged off of an automatic call distributor, the presence information indicating whether the plurality of agents are draftable to receive the call;
means for storing the received presence information;
means for detecting an indicator of a service level problem;
means for using the presence information to identify one or more draftable agents that are not in a ready state in response to detecting the indicator, including using the presence information to identify at least one draftable agent of the plurality of agents that is logged off of the automatic call distributor; and
means for distributing the call to a selected one of the identified one or more draftable agents.

26. Logic embodied in a non-transitory computer readable medium, the non-transitory computer readable medium comprising instructions, the instructions when executed by a processor operable to cause the processor to:
receive a call for connection with one of a plurality of agents;
receive presence information from the plurality of agents, the plurality of agents comprising at least one agent that is logged off of an automatic call distributor, the presence information indicating whether the plurality of agents are draftable to receive the call;
store the received presence information in a presence server;
detect an indicator of a service level problem;
in response to detecting the indicator, use the presence information to identify one or more draftable agents that are not in a ready state, including using the presence information to identify at least one draftable agent of the plurality of agents that is logged off of the automatic call distributor; and
distribute the call to a selected one of the identified one or more draftable agents.

* * * * *